Nov. 28, 1967 F. E. PAGLIUCA 3,354,546
MACHINE FOR CUTTING CHEESE INTO SMALL WEDGE-SHAPED SLICES
Filed June 14, 1965 2 Sheets-Sheet 1

INVENTOR
FREDERICK E. PAGLIUCA
BY,

*Porter & Meyer*
ATTORNEYS

Nov. 28, 1967  F. E. PAGLIUCA  3,354,546
MACHINE FOR CUTTING CHEESE INTO SMALL WEDGE-SHAPED SLICES
Filed June 14, 1965  2 Sheets-Sheet 2

INVENTOR
FREDERICK E. PAGLIUCA
BY,

Porter + Meyer
ATTORNEYS

United States Patent Office 3,354,546
Patented Nov. 28, 1967

3,354,546
MACHINE FOR CUTTING CHEESE INTO
SMALL WEDGE-SHAPED SLICES
Frederick E. Pagliuca, 93 Mystic Ave., Rear,
Medford, Mass. 02155
Filed June 14, 1965, Ser. No. 463,658
2 Claims. (Cl. 31—23)

ABSTRACT OF THE DISCLOSURE

A cheese cutting machine having a vertically reciprocating cutting frame, said frame being provided with diagonally extending horizontal cutting wires criss-crossing between the side members of said frame in such manner that there are three crossings of said wires, one adjacent the middle of a cross bar in said frame and the other two each adjacent the respective side of said frame and a base die having two cheese-receiving panels, said panels each being provided with wire-receiving grooves.

---

This invention relates to a die with matching cutters for cutting cheese into small wedge-shaped sliced chunks for packaging, and particularly for cutting blocks of cheddar cheese into small wedge-shaped sliced chunks for packaging, storage and distribution to the consumer, which is both the wholesale and institutional trade, the retailer, and the individual consumer.

While my invention is not limited to the kinds and types of cheese with which it may be used, it is particularly adapted to be used for cutting cheddar cheese and all other similar base cheeses, such as Edam, Muenster, brick cheese, all semi-soft cheeses of all types that can be constructed in block form from rectangular slabs into small wedge-shaped sliced chunks for packaging, storage and distribution. Cheddar cheese, as it comes from the producer is normally packed, stored and aged in large rectangular boxes, approximately 14 inches long, 11 inches wide and 7 inches deep, weighing approximately 40 pounds. The problem of the cheese packer and distributor is to reduce this large block of cheese into small, usable, individual, self-sustaining slices, or servings, which can thereafter be packaged and stored, without deterioration and breakage until distributed to the user, which is both the wholesale and institutional trade, which is normally the larger user, such as restaurants, hotels and institutions, and the retail trade, and thence to the ultimate consumer.

For the retail trade, my small wedge-shaped sliced chunks, individually wrapped, are packed in smaller packages such as 16 portions in a 10 oz. package, for sale in retail stores to the ultimate consumer. My invention is thus not limited to the size of package in which the wedge-shaped sliced chunks are packaged.

Heretofore, it has been held impossible to cut cheddar cheese into small individual pieces suitable for individual use which would require no further cutting because of the soft nature and constituency of the cheese, which is readily frangible, and is not self-sustaining in thin slices. In commercial practice cheddar cheese is normally packed for distribution in small jars, and is distributed in slabs the smallest practical size has been a 6 to 12 oz. slab. For this same reason it is impractical, and unsatisfactory to try to cut cheddar cheese into thin parallel-side slices. They crumble and break to readily into small pieces in cutting, and cannot withstand normal handling for wrapping and packaging.

I have accordingly sought to devise a machine which can reduce a large rectangular block of cheddar cheese, as above described, into small, usable, individually sized, self-sustaining, wedge-shaped sliced chunks without further cutting and which will not break during normal handling, and to do this in a speedy, effective, economical and non-wasteful manner, so that the chunks can then be assembled, wrapped, packaged in these useful sizes and stored without deterioration until distributed for ultimate consumption. By means of my invention it is possible to cut cheddar cheese into small, individual, wedges weighing approximately ¾ ounces and having a dimension of 1¼″ in width, 2⁵⁄₁₆″ in length and 1⁰⁄₁₆″ in thickness at its base, and tapering down to an apex of ¼ inch— which are then assembled into a 2 pound package for hotel and restaurant use, and in a 10 ounce package for retail distribution.

Briefly, my invention comprises in its basic essentials a machine having a fluid-operated press, a bed on the press, a pair of vertically movable rods, a base die mounted on the bed under the ram rods, a cutting head mounted for downward movement on the rods having transverse cutting wires, a rectangular block of cheese mountable on said die, and control means for moving said cutting head downwardly causing said wires to cut through said block of cheese to form smaller self-sustaining, wedge-shaped sections of cheese.

The nature of my invention, its objects and advantages are more fully described in the following specification and accompanying drawings, wherein.

Figure 1:
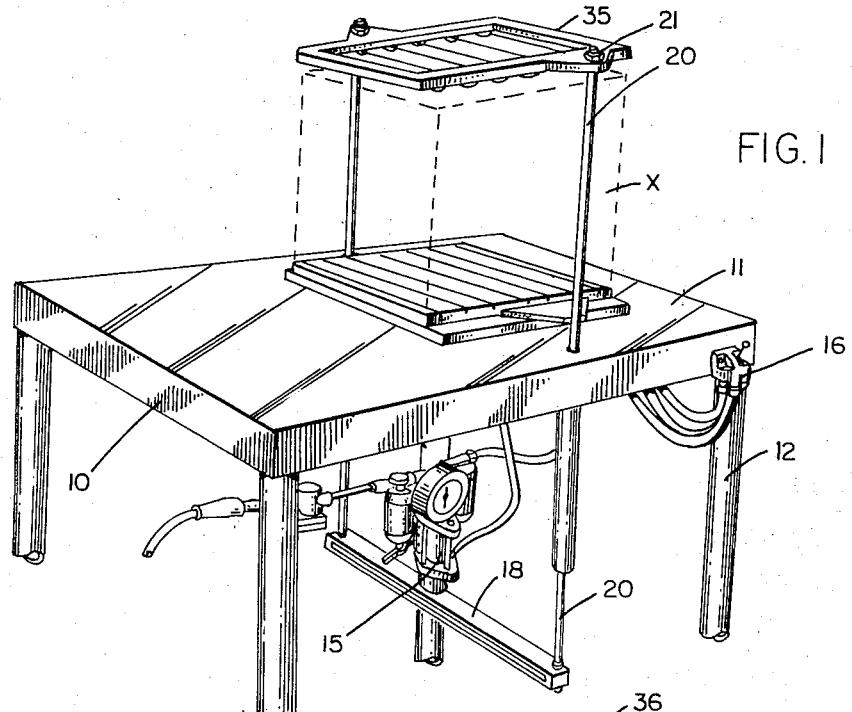
FIG. 1 is a perspective view of fluid-operated press embodying my invention.
Figure 3:
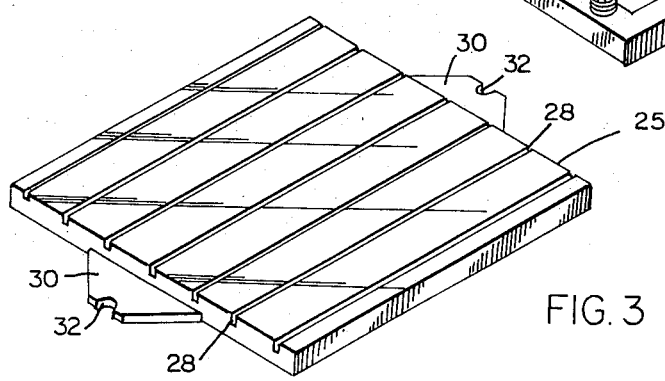
FIG. 3 is a perspective view of the first form of base die, viewed from the top.

In the drawings, 10 generally represents a standard form of compressed-air operated press of conventional type, which includes a bed 11, legs 12, a suitable compressed air system of conventional type for operating the press generally indicated at 15, and manually-operated control valves 16. It will be understood that compressed air forces yoke 18 downwardly causing rods 20 to carry first cutting head 35 downwardly, causing the cutting wires carried thereon to cut through the large block of cheddar cheese, shown in dotted lines at X (FIG. 1), and reducing it to smaller sections. Reversal of the control valves 16 then causes the rods 20 to rise carrying the cutting head 35 upwardly with it, ready for a subsequent operation. A first base die 25 is mountable on the bed 11, between the rods 20, for supporting the block of cheese X during the cutting operation (FIG. 1). Base die 25, shown in more detail in FIG. 3, comprises a rectangular flat panel 26 having a plurality of spaced transverse grooves 28 therein, corresponding to the cutting wires 40 on the first cutting head 35, which permit the cutting wires to cut through the block of cheese X by passing through into the grooves 28. Guide plates 30 having semi-circular notches 32 for receiving the rods 20 serve to position the base die 25 on the bed 11, in proper position for cutting the block of cheese X placed thereon into smaller rectangular slabs, by means of the cutting wires 40 on the first cutting head 35.

Figure 2:
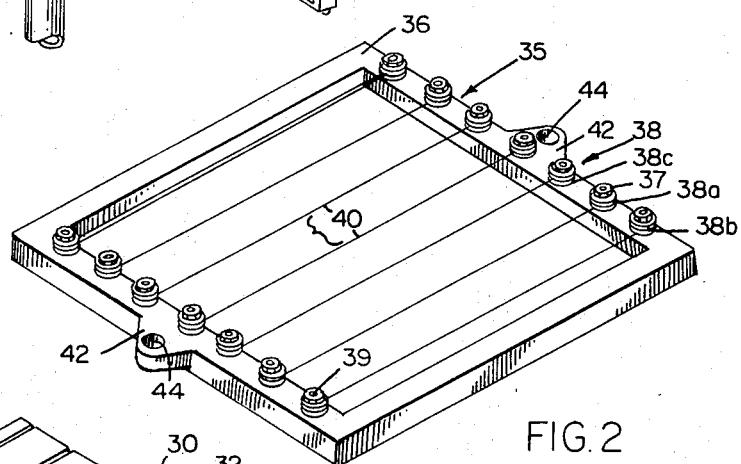
FIG. 2 is a perspective view of the first form of cutting head, viewed from the bottom (i.e. in upside down position)

As shown in FIGS. 1 and 2, first cutting head 35 comprises a rectangular metal frame 36 (shown upside down in FIG. 2) having a series of 7 split spools 38 mounted on the underside of said frame 36, approximately 2⁵⁄₁₆ inches apart, from center to center, on threaded spindles 39. It will be understood that spools 38 are divided horizontally into lower and upper sections 38a and b, and that the cutting wires 40 are tightly wound at their ends around spindles 39, between upper and lower sections 38a and b, with a rubber washer 38c inserted between them. The sections a, b and c of spools 38 are tightened and held together by means of nuts 37 on the top of spindles 39, manipulated by a suitable wrench (not shown). Guide plates 42 having holes 44 therein are provided for mounting cutting head 35 on the tops of rods 20, which rods pass through holes 44, and cutting head 35 is held fixed thereon by nuts 21. When first base die 25 and the block of cheese X are properly positioned on the bed 11 of the press 10, cutting head 35 is then fixedly mounted on the threaded tops of rods 20, which extend through the holes 44 on guide plates 42 and which are held thereon by means of nuts 21, as shown in FIG. 1. As arranged, the large block of cheese X will be cut into 6 flat rectangular slabs of cheese, which will be approximately 2 5/16 inches thick, 11 inches long, and 7 inches wide. It will be understood that the two outside wires 40 on the frame 36 are trimming wires, designed to trim off any uneven and irregular portions on the ends of the block of cheese. It will be then understood that this large slab of cheese thus cut is itself reduced in size again on die 25 by cutting head 35 into three small slabs Y approximately 2 1/4 inches high and wide, and 11 inches long.

Figure 5:
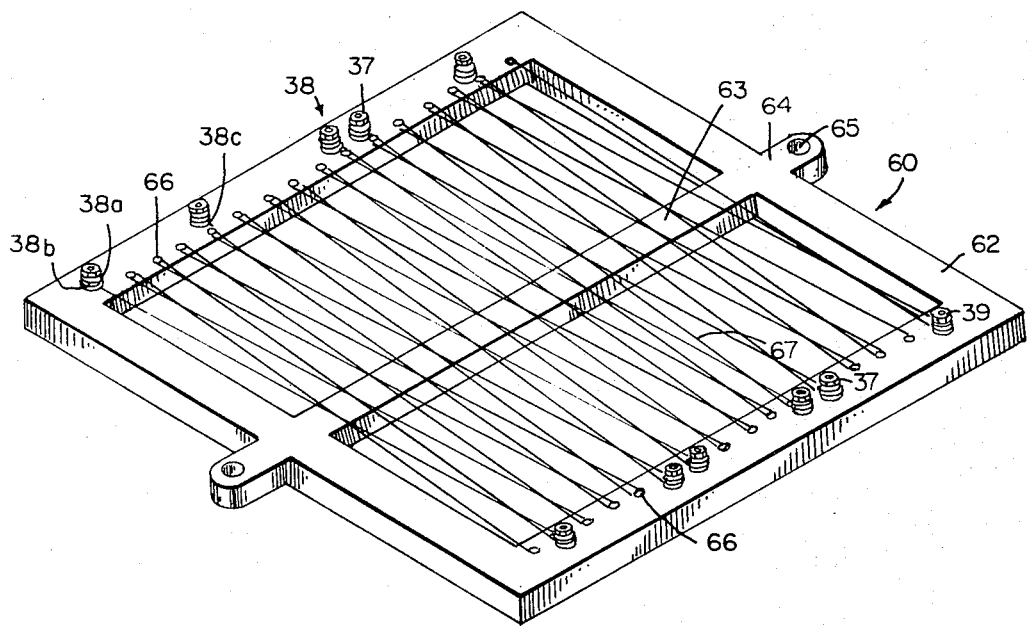
FIG. 5 is a perspective view of a second form of cutting head, viewed from the bottom (i.e. in upside down position) for cutting cheese into smaller wedge-shaped sections.
Figure 4:
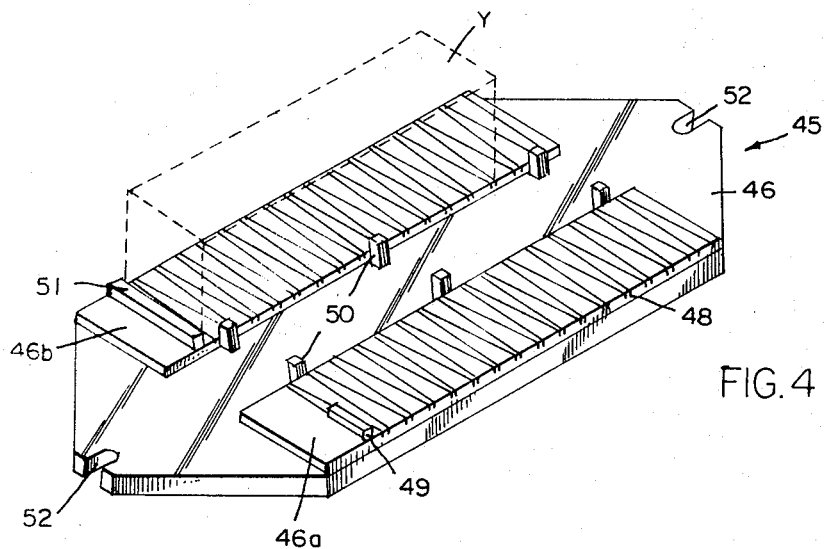
FIG. 4 is a perspective view of a second form of base die for the second form of cutting head, shown in FIG. 5, and viewed from the top.

These small slabs Y, as shown in dotted lines on FIG. 4, are in turn reduced in size to small, self-sustaining wedge-shaped chunks by means of the second base die 45 and second cutting head 60, shown in FIGS. 4 and 5 respectively. As there shown, the second base die 45 comprises the flat panel 46, which is divided longitudinally into two similar half sections 46a and 46b. Half-panels 46a and b are similar, in that each is designed to receive a slab of cheese Y, and carries a series of alternately tapering grooves 48, each alternate pair of grooves being spaced apart one-half inch at its base, and tapering down to 1/4 inch, apex, and being 2 1/4 inches long. A guide bar 51 is provided at one end on half-panel 46b to serve as a guiding mark for properly positioning the slab of cheese Y thereon and a shorter guide bar 49 is provided at the same end on the half panel 46a adjacent its first diagonal groove 48 thereon for the same purpose as to half panel 46a. As shown, 15 pairs of alternately tapering grooves are provided on each half-panel 46a and b, but this number may be varied as desired, and it is to be understood that the slab of cheese Y need not extend to the opposite end of the panel, from the guide bars 51 and 49. A series of 3 guide posts 50 are provided at the inside edge of each half-panel 46a and b, for the purpose of guiding the second cutting head 60 thereon, as described below. The ends of the panel 46 are extended and preferably tapered, as shown in FIG. 4, and include medial notches 52, for the purpose of receiving the vertical rods 20 and thus positioning the panel 46 therebetween on the bed 11 of the press 10.

The second cutting head 60 is shown in FIG. 5 and is again shown upside down and is seen to comprise a rectangular metal frame 62, divided longitudinally by the cross-bar 63. Cross-bar has longitudinal extensions 64 with holes 65 in the ends thereof, for the purpose of mounting cutting head 60 on the upper ends of rods 20, similar to the manner in which first cutting head 35 is thus mounted, as shown in FIG. 1, being held thereon by nuts 21. A series of split spools 38 are mounted on the underside of the frame 62, which are similar in all respects to those shown on the frame 36 of the first cutting head 35, except for their spacing apart, and need not be described again. The split spools 38 provide means for securing and anchoring the cutting wires 67, and include sections 38a and b, rubber washers 38c, spindles 39, nuts 37, as before. In this instance the cutting wires 67 are crossed to provide the wedge-shaped sections of cheese, and as shown in FIG. 5, the wires 67 have their ends secured by the spools 38 and are passed around pins 66 on the opposite side of cutting head 60, in such manner that adjacent wires 67 cross three times, once in the middle at cross-bar 63, and once on each side inwardly from the sides of the frame 62.

As before, with the first cutting head 35 second cutting head 60 is inverted and securely inserted on the top ends of rods 20, and is then caused to descend, with the wires 67 cutting through the slabs of cheese Y mounted on the two half panels 46a and b, to form small wedge-shaped chunks of cheese, as the wires 67 pass through the cheese and into the grooves 48 on the half panels 46a and b.

Each slab of cheese Y, which has been cut into small wedge-shaped chunks while still intact, is placed on first base die 25, and when properly positioned thereon is then cut once more in half longitudinally, with cutting head 35, using one cutting wire 40 for this purpose. The final wedge-shaped sliced chunk has a dimension of 1/2 inch base, tapering to an apex of 1/4 inch, with a length of 2 1/4 inches, and a width of 1 1/8 inches, and weighs slightly less than 3/4 ounces.

An operator then interleaves a continuous strip of colored cellophane film between each wedge-shaped chunk, a slab of 24 double wedges (48 individual wedges) is then placed in a Cryovac type plastic bag, a vacuum is drawn on the bag, the ends are sealed, and the plastic bag is shrunk around the slab of cheese by immersing it in hot water. These steps of packaging and wrapping cheese are well known, and form no part of my invention. The package thus wrapped keeps indefinitely, with a minimum guarantee of two years. Two slabs containing 48 individual wedge-shaped chunks are usually packed together for the institutional trade, weighing approximately 2 pounds each, and for the retail trade 16 wedge-shaped sliced chunks are packed together in a package, weighing approximately 10 ounces.

It will be thus seen that I have provided a machine for cutting cheddar cheese into small, individual self-sustaining, wedge-shaped sliced chunks, which will survive normal handling without breakage before consumption, and have done this in a speedy, economical, and effective manner. This has never been deemed possible for cheddar cheese.

I claim:

1. In a machine adapted to cut a pair of sized rectangular slabs of cheese simultaneously into a plurality of individual identical self-sustaining wedge-shaped chunks which comprises a press having a fixed bed, a pair of vertically-extending and vertically-reciprocating parallel rods extending through said bed, fluid means for actuating both said rods for vertical movement simultaneously and control means for actuating said fluid means, a cutting head comprising a rectangular metal frame member, said member being provided with an elongated longitudinally extending cross-bar member, the cross-bar member dividing said frame member into two equal parts and forming two identical rectangular openings in said frame member, said cross-bar member extending beyond both ends of said frame member and terminating in each end with means for attaching said frame member to the free end of each said rod, the side members of said frame member each being provided with a row of opposed equally spaced downwardly extending cylindrical wire-receiving members, a pair of cheese cutting wires each extending diagonally back and forth between alternate wire-receiving members of said side members across said openings in such manner that such wires cross each other in the vicinity of the middle of the said cross bar, said wires additionally passing around each of said wire-receiving members with which each particular wire comes into contact in such manner that the said wire crosses itself in the vicinity of the said wire-receiving member, thereby creating three lines of wire crossings, one at the middle of the cross-bar and the other two adjacent the respective side members of said frame member within the respective openings therein, and a base die mounted on said bed, said base die having two spaced rectangular elevated panels each adapted to receive a slab of cheese, said panels being located respectively in register with the respective openings in said frame, the sides of each said panel so located that the inner side in each case is spaced from the cross-bar of said cutter frame and the outer side in each case is spaced from the respective side member of said cutter frame a sufficient distance that the wire crossing adjacent each said side member lies beyond the outer side of each said panel, each said base die having alternately tapering transverse grooves formed therein in position to receive said wires in each pass of said wires between the side members of said frame member, each said panel having at at least one end thereof an upstanding guide bar immediately adjacent said end and adapted to rest against the end of a slab of cheese to permit the proper positioning of such slab on said panel, and a plurality of upstanding guide posts spaced immediately adjacent each said panel along the inner edge thereof, said guide posts cooperating with said cross-bar as said frame member approaches said die to properly position the cutter frame relative to said base die.

2. The machine as claimed in claim 1 wherein said base die is removable from said bed, and wherein the ends of said base die are each provided with a lateral extension, each said extension having a medial notch adapted to receive one of said vertically extending and vertically reciprocating parallel rods to position said die therebetween in register with said cutting frame.

References Cited

UNITED STATES PATENTS

| 893,591 | 7/1908 | Larsen | 31—25 |
| 1,132,378 | 3/1915 | Patterson | 31—25 |
| 2,561,274 | 7/1951 | Harrington | 31—25 |
| 3,027,639 | 4/1962 | Lovell | 146—160 X |

W. GRAYDON ABERCROMBIE, *Primary Examiner.*